(12) United States Patent
Draijer

(10) Patent No.: US 7,538,807 B2
(45) Date of Patent: May 26, 2009

(54) METHOD AND APPARATUS FOR IN A MULTI-PIXEL PICK-UP ELEMENT REDUCING A PIXEL-BASED RESOLUTION AND/OR EFFECTING ANTI-ALIASING THROUGH SELECTIVELY COMBINING SELECTIVE PRIMARY PIXEL OUTPUTS TO COMBINED SECONDARY PIXEL OUTPUTS

(75) Inventor: Cornelis Draijer, Waalre (NL)

(73) Assignee: DALSA Corporation, Waterloo (CA)

( * ) Notice: Subject to any disclaimer, the term of this patent is extended or adjusted under 35 U.S.C. 154(b) by 595 days.

(21) Appl. No.: 10/994,227

(22) Filed: Nov. 23, 2004

(65) Prior Publication Data
US 2006/0109352 A1 May 25, 2006

(51) Int. Cl.
*H04N 5/335* (2006.01)

(52) U.S. Cl. ................................ 348/272; 348/283

(58) Field of Classification Search ............ 348/333.11, 348/311, 272, 273, 280–283
See application file for complete search history.

(56) References Cited

U.S. PATENT DOCUMENTS

| | | | | |
|---|---|---|---|---|
| 4,322,638 | A * | 3/1982 | Lee et al. ............... | 327/515 |
| 5,440,343 | A * | 8/1995 | Parulski et al. ........ | 348/316 |
| 5,880,777 | A * | 3/1999 | Savoye et al. .......... | 348/217.1 |
| 5,926,215 | A | 7/1999 | Whipple et al. | |
| 6,687,026 | B1 | 2/2004 | Steinebach | |
| 2003/0086005 | A1 | 5/2003 | Nakamura | |

FOREIGN PATENT DOCUMENTS

| | | | |
|---|---|---|---|
| EP | 776124 A2 | * | 5/1997 |
| EP | 1033869 | | 9/2000 |
| JP | 4323973 | | 11/1992 |

* cited by examiner

*Primary Examiner*—Tuan V Ho
(74) *Attorney, Agent, or Firm*—Fisher Technology Law PLLC (57) ABSTRACT

A method for in a multi-pixel pick-up element reducing a pixel-based resolution and/or effecting anti-aliasing through selectively combining selective primary pixel outputs to combined secondary pixel outputs, comprises the following steps:
  row-wise, whether or not restrictively, selecting pixels for loading into a first parallel-in register;
  serial shifting of the load within the register for aligning selected first pixels in the first parallel-in register with selected second pixels not in the first parallel-in register;
  arithmetically combining pixel groups so aligned;
  and outputting combination results from preselected multi-pixel configurations as secondary pixels.

The invention is applicable to a selection from amongst a two-dimensional pick-up array, an Interline Architecture, a Frame Transfer Architecture, a combination of those two, a TDI pick-up array, and a linear pick-up array, and for both mono-color and multi-color pick-up facilities.

15 Claims, 6 Drawing Sheets

METHOD AND APPARATUS FOR IN A MULTI-PIXEL PICK-UP ELEMENT REDUCING A PIXEL-BASED RESOLUTION AND/OR EFFECTING ANTI-ALIASING THROUGH SELECTIVELY COMBINING SELECTIVE PRIMARY PIXEL OUTPUTS TO COMBINED SECONDARY PIXEL OUTPUTS

BACKGROUND OF THE INVENTION

The invention relates to a method for reducing a pixel-based resolution through selectively combining selective primary pixel outputs to combined secondary pixel outputs in a multi-color pick-up element, as recited in the opening paragraph of Claim 1.

Prior art, in particular as relating to CCD technology, has produced two-dimensional pick-up array devices with the number of pixels already passing the 1M level. For use in producing still pictures, the image rate is relatively low, such as a few per second, and the image outputting has been found fast enough. For movie images however, the output image rate has become a bottleneck. On the one hand, picture resolution may be maintained at its maximum level through multiplication of circuitry elements, but this would make the device much too expensive. On the other hand, prior art has found that a certain image preprocessing operation will lower output speed requirements, while also, in many applications a reduced resolution is less critical.

In particular, U.S. Pat. No. 5,926,215 presents a clear and well-defined procedure, as follows: read out rows 1, 2, 3, dump #2, and combine rows 1 & 3; then, read out rows 4, 5, 6, dump 5, and combine rows 4 & 6, and so on. In this way, the overall number of rows is lowered by a factor of three (3). Note that the combined row pairs have identical color patterns in the Bayer scheme, which in various situations will solve the color mix-up problem. On the other hand, the complete dumping of one third of the rows, and the reconstruction of a new pattern over a scale that is three times as large as the original vertical scale will tend to spoil much detail in the picture. Finally, the prior art has been found to be not amenable to flexibility, in the sense that the resolution could be adjusted to needs, and/or to the nature of the scene as imaged.

SUMMARY TO THE INVENTION

In consequence, amongst other things, it is an object of the present invention to provide a procedure that retains relatively much detail of the original, has the combining process located relatively early in the image processing, and allows adjusting of the resolution in a straightforward and fine-tunable manner.

Now therefore, according to one of its aspects, the invention is characterized as recited in the characterizing part of Claim 1, as follows:

selecting pixels of one row for loading these pixels into a first parallel-in register;
serial shifting of the load within said register for aligning color pixels in said register with selected like-colored pixels not in said register;
arithmetically combining the pixel contents of pixel groups so aligned;
and outputting combination results as said secondary pixels.

It has been found that with combining the pixel contents the resolution can thus be lowered in a straightforward and uncomplicated manner. Various other advantageous aspects of the invention, which therefore allow other applications, are the following. First, through diminishing the number of pixels by binning, the signal-to-noise ratio of the resulting image can be improved. Also, this can raise the useful sensitivity of a device such as applicable in applications with low light intensity. Second, fast and easy conversion of the image to an RGB pattern with fewer pixels can make it suitable for immediate display in a preview, viewfinder, or other application. A diminution would not represent a disadvantage, especially, when the original aspect ratio is maintained. Furthermore, the inventor has found that various applications of the invention would present advantageous anti-aliasing effects, such as those that would generate moiré patterns. Furthermore, the invention can be used to retain the aspect ratio Width/Height of the image. It is to be noted that in this application "arithmetically" in particular means the arithmetic operations of adding, averaging and dividing, although other arithmetic operations are conceivable.

Preferably in a method according to the invention said arithmetically combining is executed between said first parallel-in register and a second parallel-in register. In this way the aligning and combining process can be more flexible and more easily implemented.

The invention would also be amenable to other hardware configurations than the two-dimensional Bayer pattern cited supra. First, other multi-color configurations such as stripe filters, complementary color filters, or other color systems are similarly possible. Second, a mono-color pick-up implementation could just as well yield anti-aliasing, be it that the pixels to be combined constitute prespecified mono-color configurations; the various configurations of combined pixels can be made to overlap each other. Third, a so-called TDI configuration that has continuous read-out is applicable as well. Still further, a Frame Transfer Architecture, an Interline Device Architecture, or a combination of those two would be applicable. Finally, a single-line pickup device can just as well be used as input for the associated shifting & combining operations of the invention.

The invention also relates to an apparatus as recited in Claims 10 or 11 and being arranged for implementing the method as claimed in Claims 1 or 2, respectively, and to a digital electronic camera provided with such an apparatus and being recited in Claims 12 and 13. Further advantageous aspects of the invention are recited in dependent Claims.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate:

FIG. 2, an initial stage in the combining process;

FIG. 3, a further stage in the combining process;

DETAILED DESCRIPTION OF PREFERRED EMBODIMENTS

Figure 1A:
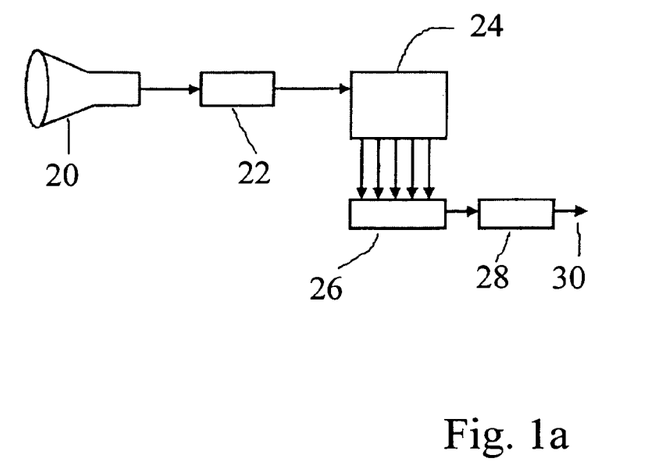
FIG. 1a, an elementary block-diagram of an apparatus according to the invention.

FIG. 1a illustrates an elementary and largely functional block diagram of an apparatus according to the invention, such as may be embodied in a digital electronic camera. Image reception is effected through optics 20. Optical/electrical conversion is effected in converter 22 that feeds matrix 24, and the latter being constructed from rows and columns. Data transfer facility 26 accesses the pick-up matrix and allows to selectively access and combine certain pixel contents. The preprocessing feeds secondary storage 28 that allows to interface output 30 to a user device such as a TV screen, printer, or other imaging facility. Note that the above representation does not consider the distribution of various functions over separate semiconductor chips. Notably, digital signal processing (DSP) has not been specifically shown. In fact, item 22 can readily be located on the same chip as matrix 24 as well as item 26. Operation with a single-line pick-up will be straightforwardly derivable from the set-up as represented.

Figure 1B:
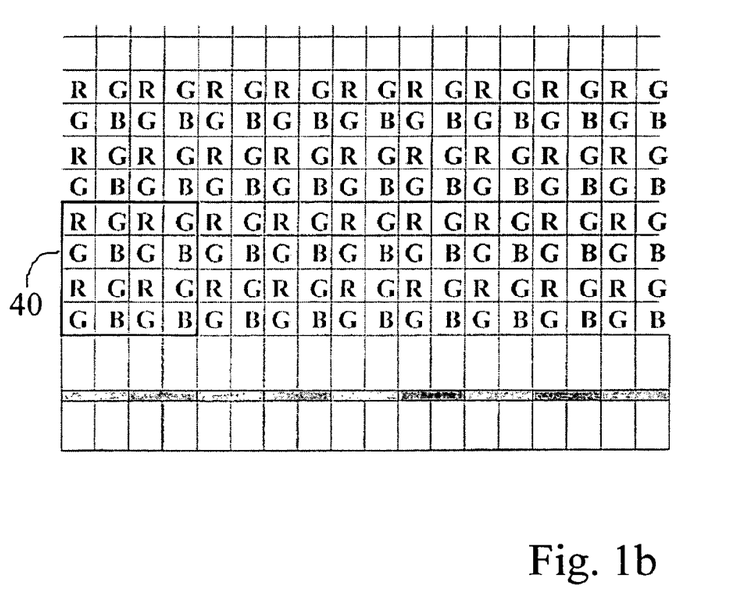
FIG. 1b, the start stage for the combining process with the four by four cell to be combined.

FIG. 1b illustrates the start stage for the combining process with the four by four cell 40 to be combined. Please note that, where in the following figures and in the corresponding text a superscript like 2 or 3 is used, the meaning thereof is not a power of 2 or 3 but merely a label. A subscript 2 or 3 could have been used as well.

FIG. 2 illustrates an initial stage in the combining process. The RGB pattern as shown is the well-known Bayer pattern, although the invention is not restricted thereto. The example has pixel combining been devised for a four by-four combination or binning, as shown by block indication 40, of which the lower row in this figure has already been entered into the processing. The binning is not restricted to the 4×4 size, nor to a square sub-matrix, as will be discussed hereinafter. Now, the processing is started by putting the content of the undermost line of pixels into a first parallel-in register 42, and there from transferring the content of pairs of pixels selectively as shown into a second parallel-in register symbolically indicated by row 44. The selection of the pairs of pixels is realized by a gate device at the interface of the first and second parallel-in register, symbolically indicated by thick line 46.

FIG. 3 illustrates a further stage in the combining process, in that the pixel data in the first register 42 have been shifted two pixel positions to the left for aligning.

Figure 4:
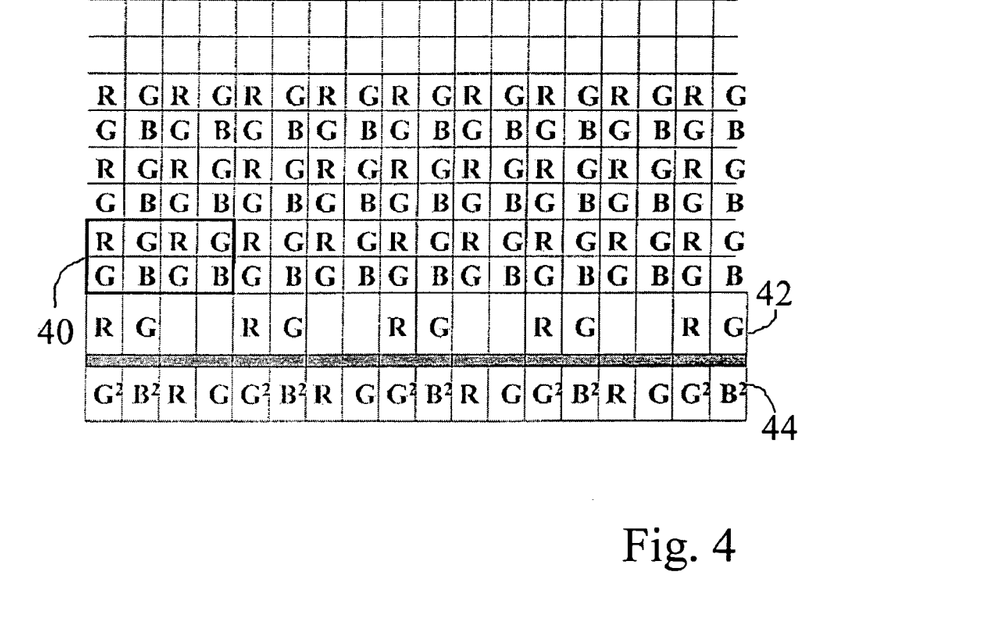
FIG. 4, a still further stage in the combining process.

FIG. 4 illustrates a still further stage in the combining process in that first, the content of the pixels still in the register have been added to the pixel values in the second parallel-in register 44, which been denoted according to $G+G=G^2$, and likewise for $B+B=B^2$. Furthermore, the next line of pixels (R and G) has already been read out of the matrix into the register, and two by two the content of the pixels thereof have been entered into the still empty positions of the second register 44. Other kinds of arithmetic combining such as averaging can be used.

Figure 5:
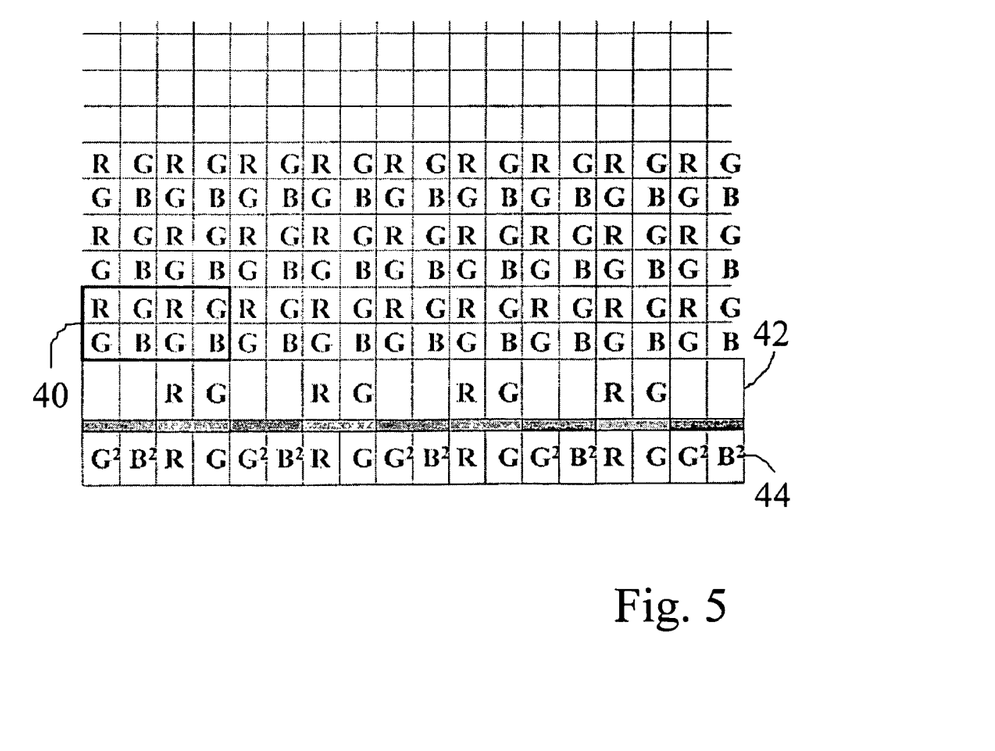
FIG. 5, a still further stage in the combining process.

FIG. 5 illustrates a still further stage in the combining process, in that the contents of the register 42 have been shifted over two positions to the right for aligning, and for addition to the corresponding pixels. After the adding, the register is empty again.

Figure 6:
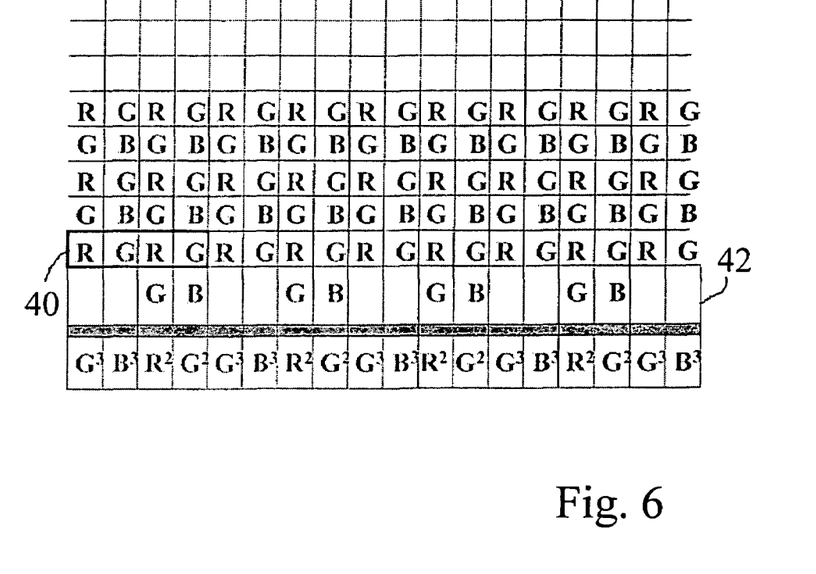
FIG. 6, a still further stage in the combining process.

FIG. 6 illustrates a still further stage in the combining process, in that the third row of matrix 40 has been read into register, and the content of two pixels thereof added two by two to corresponding pixels in the second register 44, which has been denoted according to $G^2+G=G^3$, and likewise $B^2+B=B^3$.

Figure 7:
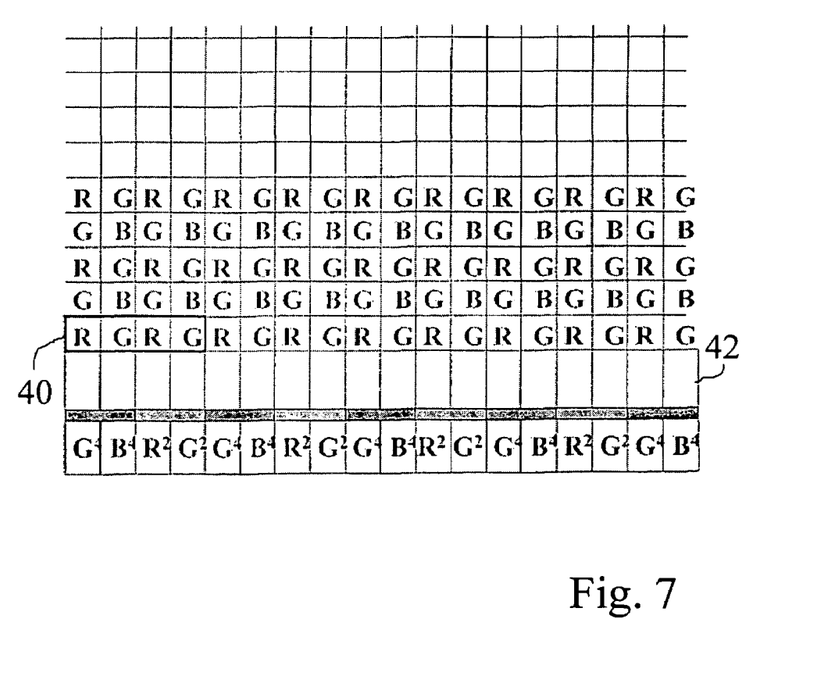
FIG. 7, a still further stage in the combining process.

FIG. 7 illustrates a still further stage in the combining process, in that the first register 42 has been shifted two positions to the left, and the pixels therein added to the pixel content in the second register.

Figure 8:
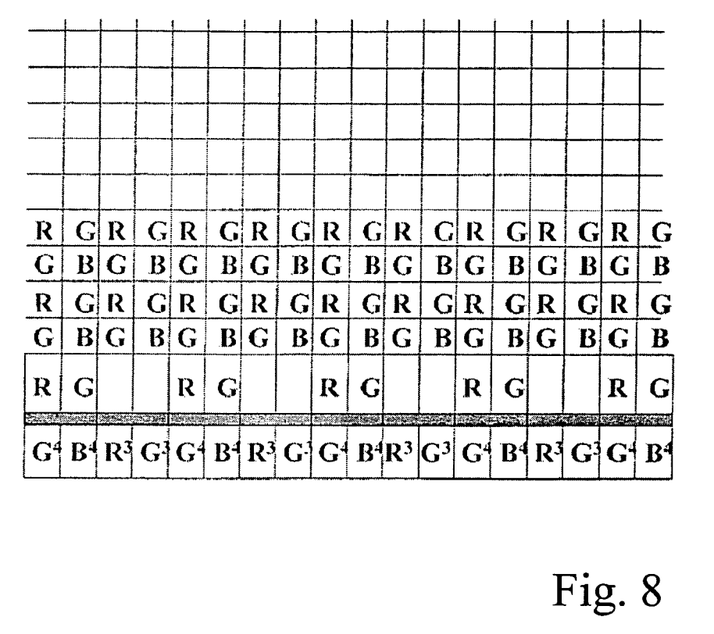
FIG. 8, a still further stage in the combining process.

FIG. 8 illustrates a still further stage in the combining process, in that the last (upper) row of submatrix 40 has now been read into first register 42, and half of its pixels have been added to the pixel content in the second register. After shifting two positions to the right (not shown), and addition to the pixel content in the second register, the content therein now combine four pixels in the original submatrix 40.

Figure 9:
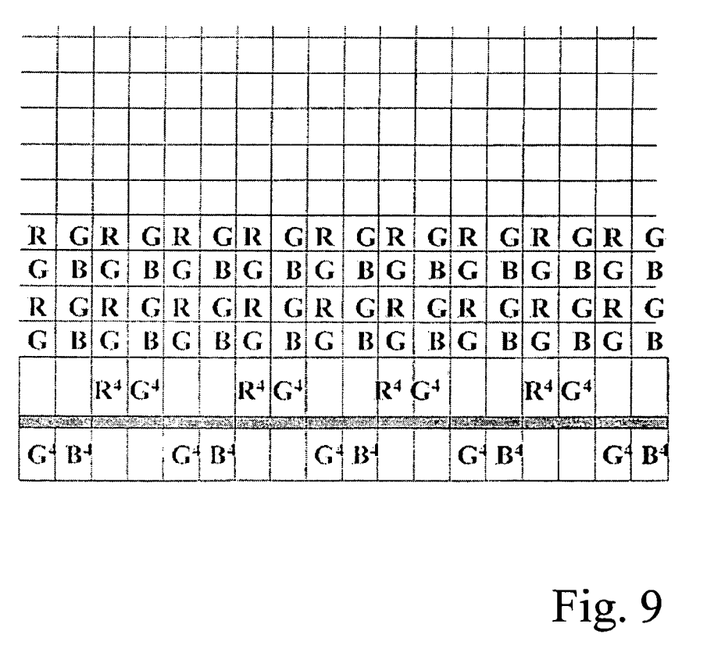
FIG. 9, a still further stage in the combining process.

FIG. 9 illustrates a still further stage in the combining process, in that every other pair of pixel contents in the second register are loaded back in register 42 for serial readout, so that only two colors are read-out in a single operation. Two such read-out operations are needed for a full read-out (of four original rows). If all of the pixel content in the second register are transferred to the register, this follows an RGGB pattern. On the one hand, this is a faster operation. On the other hand, post-processing is needed, because the two consecutive G pixels must be rearranged to conform to a Bayer pattern with alternating row patterns. The remainder of the conversion repeats the above on a repetition pattern of four rows. In practice, a smaller or larger pattern sub-matrix can be converted to a reduced pattern.

FIGS. 10a through 10d illustrate various binning formats. First, FIG. 10a repeats the binning format of earlier FIGS. 2-9, wherein a block of 4×4 pixels is combined to a row of 4 combined pixels. The resulting pixels have uniform weights, in that they each combine four original pixels.

Figure 10A:
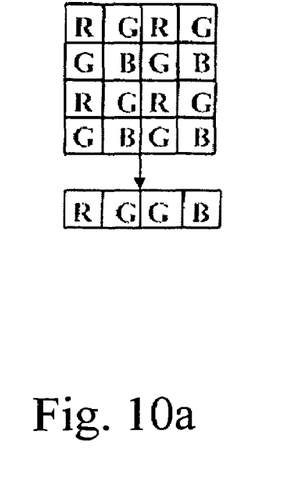
FIGS. 10a through 10d various binning formats.
Figure 10B:
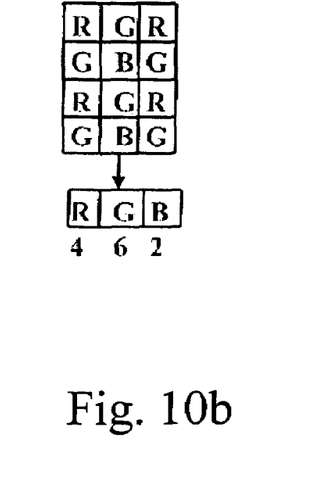

FIG. 10b combines a block of 3×4 pixels to a row of 3 combined pixels. The resulting pixels have non-uniform weights, in that they combine 4, 6, and 2 original pixels respectively, as indicated by the numerals printed therebelow. For a correct representation, the various color values should be corrected by an appropriate factor to result in uniform representation. It would be clear that binning configurations of 4×3 original pixels would be feasible likewise. By themselves, RGB pattern with equal pixel numbers for the three colors would map straightforwardly on a three-color display.

Figures 10C, 10D:
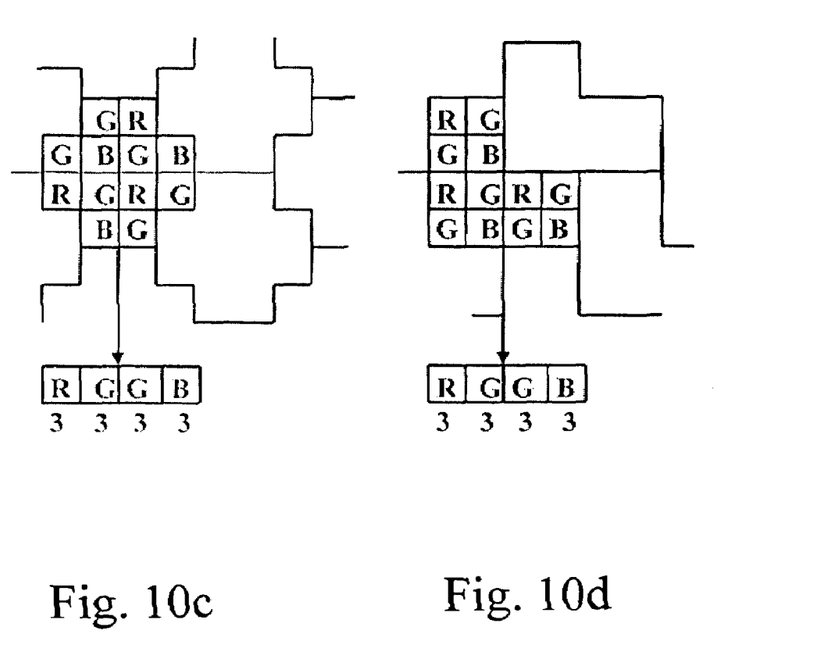

FIG. 10c shows that it would not be necessary to have rectangular binning configurations. As shown, a cross-formed by 12 pixels can be tiled to fill the two-dimensional pixel array completely. Furthermore, each combined pixel is made from a uniform number of 3 original pixels. The only complication is that the pixel combining operations are not uniform amongst all original pixels of a row, but depend on which row within a binning configuration they represent.

FIG. 10d shows that it would not be necessary for the binning configuration to be symmetrical with respect to horizontal and vertical directions. Also here, the L-shaped binning configurations formed by 12 pixels can be tiled to completely fill the two-dimensional pixel array. Other, still less regular configurations could suit the need of various applications. Likewise, it would not be necessary to have uniform binning configurations over the whole image. Particular, high-detail parts or Regions-Of-Interest of a scene could be represented by smaller configurations, whereas uniform parts of the image, such as a clear sky or a lightless area, could be represented by larger configurations. Furthermore, in contradistinction to the embodiments such as in FIGS. 10c, 10d, the coverage of the original pixels need not be on a one-to-one basis. On the one hand, a selection of the original pixels could be fully left out of consideration, such as was already done in the reference cited supra. In contrast, it would be feasible as well to have certain pixels contribute to more than a single binning configuration.

Now, various aspects of the invention have been illustrated with respect to the above embodiments. Various further aspects may be recited as follows. It would be possible to select between reading-out versus dumping of certain original or combined pixel data: in fact, it is feasible to dump whole lines and/or columns of pixels. Further, through appropriate data reduction, the image read-out can be substantially speeded-up. Further, the combining of various pixels in the manner described allows for immediate gamma correction and subsequent transfer to an electronic image representation facility. Finally, through binning of overlapping data, an anti-aliasing operation can be straightforwardly implemented. By itself, such operations have been well documented in the art. Furthermore, the combining of pixels can be done by other operations, such as by averaging.

Now, the present invention has hereabove been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as have been recited in the Claims.

The invention claimed is:

1. A method of processing a first pixel array into a second pixel array in an apparatus, the apparatus including a first register, the first register including a plurality of first register segments, the first pixel array including a first row, the first row including a plurality of first row segments, each first row segment corresponding to a respective first register segment, each first row segment including first and second pixels, the method comprising:
   parallel loading a signal from the first pixel in each first row segment into a first element of the corresponding first register segment of the first register;
   aligning the signal from the first pixel of each row segment with the second pixel of the same first row segment by serially shifting the first register;
   for each first register segment, arithmetically combining a signal from the second pixel of the corresponding first row segment with the signal from the first pixel of the same first row segment after the first register has been serially shifted; and
   outputting the arithmetically combined results as a part of the second pixel array.

2. A method according to claim 1, wherein:
   the apparatus further includes a second register;
   the arithmetically combining includes parallel loading all content of the first register into the second register and then parallel loading a signal from the second pixel in each first row segment into a second element of each corresponding first register segment;
   the aligning shifts the first register so that the signal from the second pixel in each first row segment stored in the first register aligns with the signal from the first pixel of each first row segment stored in the second register; and
   the arithmetically combining further includes arithmetically combining each element in the first register with a corresponding element in the second register in parallel.

3. A method according to claim 1, wherein the arithmetically combining includes combining signals between the first register and a second register.

4. A method according to claim 1, wherein the outputting of the arithmetically combined results includes one of outputting readout data and dumping readout data.

5. A method according to claim 1, further comprising immediate gamma correcting of the second pixel array and subsequent transferring of gamma corrected data directly to an image representation facility.

6. A method according to claim 1 for use in anti-aliasing through binning of overlapping data sampling.

7. A method of processing a first pixel array in an apparatus, the apparatus including first and second registers, the first register including a plurality of first register segments, the second register including a plurality of second register segments, the first pixel array including first and second rows, the first row including a plurality of first row segments, each first row segment corresponding to a respective first register segment, each first row segment including first and second pixels, the second row including a plurality of second row segments, each second row segment corresponding to a respective first register segment, each second row segment including first and second pixels, the method comprising:
   parallel loading a signal from the first pixel of each first row segment into a first element of a corresponding first register segment;
   arithmetically combining the contents of the first register with the contents of the second register and storing the results in the second register;
   parallel loading a signal from the second pixel of each first row segment into a second element of the corresponding first register segment;
   shifting the first register in a first direction until the signal from the second pixel of each first row segment aligns with the signal from the first pixel of the first row segment;
   parallel loading a signal from the first pixel of each second row segment into a third element of the corresponding first register segment;
   arithmetically combining the contents of the first register with the contents of the second register and storing the results in the second register;
   parallel loading a signal from the second pixel of each second row segment into a fourth element of the corresponding first register segment; and
   shifting the first register in a second direction until the signal from the second pixel of each second row segment aligns with the signal from the first pixel of the second row segment, the first direction being opposite to the second direction.

8. A method according to claim 7, wherein the first pixel array further includes a third row that includes a plurality of third row segments wherein each third row segment corresponds to a respective first register segment and includes first and second pixels, the method further comprising:
   parallel loading a signal from the first pixel of each third row segment into the first element of the corresponding first register segment;
   arithmetically combining the contents of the first register with the contents of the second register and storing the results in the second register;
   parallel loading a signal from the second pixel of each third row segment into the second element of the corresponding first register segment;
   shifting the first register in the first direction until the signal from the second pixel of each third row segment aligns with the signal from the first pixel of the third row segment; and
   arithmetically combining the contents of the first register with the contents of the second register and storing the results in the second register.

9. A method of processing a first pixel array in an apparatus, the apparatus including first and second registers, the first pixel array including first and second rows, the first row including first and second pixels, the second row including first and second pixels, the method comprising:

loading a signal from the first pixel of the first row into a first element of the first register;

arithmetically combining contents of the first register with contents of the second register and storing the results in the second register;

loading a signal from the second pixel of the first row into a second element of the first register;

shifting the first register until the signal from the second pixel of the first row aligns with the signal from the first pixel of the first row;

loading a signal from the first pixel of the second row into a third element of the first register;

arithmetically combining the contents of the first register with the contents of the second register and storing the results in the second register;

loading a signal from the second pixel of the second row into a fourth element of the first register; and shifting the first register until the signal from the second pixel of the second row aligns with the signal from the first pixel in the second row.

10. A method according to claim 9, wherein the first pixel array further includes a third row that includes first and second pixels, the method further comprising:

loading a signal from the first pixel of the third row into the first element of the first register;

arithmetically combining the contents of the first register with the contents of the second register and storing the results in the second register;

loading a signal from the second pixel of the third row into the second element of the first register; and shifting the first register until the signal from the second pixel of the third row aligns with the signal from the first pixel of the third row.

11. A method according to claim 10, wherein the first pixel array further includes a fourth row that includes first and second pixels, the method further comprising:

loading a signal from the first pixel of the fourth row into the third element of the first register;

arithmetically combining the contents of the first register with the contents of the second register and storing the results in the second register;

loading a signal from the second pixel of the fourth row into the fourth element of the first register; and shifting the first register until the signal from the second pixel of the fourth row aligns with the signal from the first pixel of the fourth row.

12. An apparatus for processing a first pixel array, the apparatus comprising:

first and second shift registers;

a selection facility operable to load a signal from a first pixel of a first row of the first pixel array into a first element of the first register;

an arithmetic combination facility operable to combine contents of the first register with contents of the second register and store the results in the second register, the selection facility being further operable to load a signal from a second pixel of the first row into a second element of the first register; and a shift control facility operable to shift the first register until the signal from the second pixel of the first row aligns with the signal from the first pixel of the first row.

13. An apparatus according to claim 12, wherein:

the selection facility is further operable to load a signal from a first pixel of a second row of the first pixel array into a third element of the first register;

the arithmetical combination facility if further operable to combine the contents of the first register wit to contents of the second register and store to results in the second register;

the selection facility is further operable to loading a signal from a second pixel of the second row into a fourth element of the first register; and the shift control facility is further operable to shift the first register until the signal from the second pixel of the second row aligns with the signal from the first pixel in the second row.

14. A method according to claim 12, wherein the first pixel array is a part of one of a two-dimensional pick-up array, an interline architecture, a frame transfer architecture, a combination of the interline architecture and the frame transfer architecture, a TDI pick-up array, and a linear pick-up array.

15. A method according to claim 12, wherein the first register is operable to serially shift in both forward and backward directions.

* * * * *

UNITED STATES PATENT AND TRADEMARK OFFICE
CERTIFICATE OF CORRECTION

PATENT NO.         : 7,538,807 B2
APPLICATION NO. : 10/994227
DATED              : May 26, 2009
INVENTOR(S)       : Cornelis Draijer

It is certified that error appears in the above-identified patent and that said Letters Patent is hereby corrected as shown below:

In line 5 of claim 13 (column 8), change "if" to "is".

In line 6 of claim 13 (column 8), change "wit" to "with".

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,538,807 B2  
APPLICATION NO. : 10/994227  
DATED : May 26, 2009  
INVENTOR(S) : Cornelis Draijer Page 1 of 1

It is certified that error appears in the above-identified patent and that said Letters Patent is hereby corrected as shown below:

Column 8, Claim 13, line 25, change "if" to "is".

Column 8, Claim 13, line 26, change "wit" to "with".

This certificate supersedes the Certificate of Correction issued October 6, 2009.

Signed and Sealed this

Twenty-seventh Day of October, 2009

David J. Kappos
*Director of the United States Patent and Trademark Office*